United States Patent
Anderson et al.

(10) Patent No.: US 9,821,493 B2
(45) Date of Patent: Nov. 21, 2017

(54) MICROWAVE DIPOLAR HEATING OF ENERGETIC POLYMERS FOR CARBON FIBER-MATRIX SEPARATION

(71) Applicant: Empire Technology Development LLC, Wilmington, DE (US)

(72) Inventors: Kraig Anderson, Burlingame, CA (US); Angele Sjong, Louisville, CO (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 15/174,405

(22) Filed: Jun. 6, 2016

(65) Prior Publication Data
US 2016/0279834 A1 Sep. 29, 2016

Related U.S. Application Data

(62) Division of application No. 13/883,446, filed as application No. PCT/US2012/050352 on Aug. 10, 2012, now Pat. No. 9,394,646.

(51) Int. Cl.
*B29B 17/02* (2006.01)
*D06M 10/00* (2006.01)
(Continued)

(52) U.S. Cl.
CPC ........ *B29B 17/021* (2013.01); *B29B 17/0206* (2013.01); *B29C 35/0805* (2013.01); *B29C 35/12* (2013.01); *D01F 9/12* (2013.01); *D01F 11/14* (2013.01); *D06M 10/003* (2013.01); *D06M 15/19* (2013.01);
(Continued)

(58) Field of Classification Search
CPC ............. B29B 17/021; B29B 17/0206; B29C 35/0805; B29C 35/12; B29C 2035/0855; D01F 9/12; D01F 11/14; D06M 10/003; D06M 15/19; Y10T 442/2934; Y10T 442/2943; Y10T 442/2951;
(Continued)

(56) References Cited

U.S. PATENT DOCUMENTS

| 3,776,829 A | 12/1973 | Goan |
| 2002/0017162 A1 | 2/2002 | Dannenhauer et al. |

(Continued)

FOREIGN PATENT DOCUMENTS

| EP | 0 694 92 | 1/1983 |
| JP | 08-092392 | 4/1996 |
| WO | WO-2011/065694 A2 | 6/2011 |

OTHER PUBLICATIONS

"Composite Materials Handbook, Polymer Matrix Composites Materials Properties," U.S. Department of Defense, vol. 2 of 5, Jun. 17, 2002 (529 pages).
(Continued)

*Primary Examiner* — Xiuyu Tai
(74) *Attorney, Agent, or Firm* — Maschoff Brennan

(57) ABSTRACT

The present technology provides a carbon fiber reinforced plastic that includes carbon fibers covalently bonded to an energetic polymer and a polymer matrix. Also described is a method for recycling carbon fibers from the carbon fiber reinforced plastic material using microwave energy to separate the carbon fibers from the polymer matrix.

20 Claims, 2 Drawing Sheets

(51) Int. Cl.

| | | |
|---|---|---|
| *D06M 15/19* | (2006.01) | |
| *D01F 11/14* | (2006.01) | |
| *B29C 35/12* | (2006.01) | |
| *B29C 35/08* | (2006.01) | |
| *D01F 9/12* | (2006.01) | |
| *B29K 105/06* | (2006.01) | |
| *B29K 307/04* | (2006.01) | |

(52) U.S. Cl.
CPC .. *B29C 2035/0855* (2013.01); *B29K 2105/06* (2013.01); *B29K 2307/04* (2013.01); *Y02W 30/622* (2015.05); *Y10T 442/2934* (2015.04); *Y10T 442/2943* (2015.04); *Y10T 442/2951* (2015.04); *Y10T 442/2959* (2015.04); *Y10T 442/2984* (2015.04)

(58) Field of Classification Search
CPC ........ Y10T 442/2959; Y10T 442/2984; Y02W 30/622; B29K 2105/06; B29K 2307/04
See application file for complete search history.

(56) References Cited

U.S. PATENT DOCUMENTS

| | | | |
|---|---|---|---|
| 2005/0281968 A1 | 12/2005 | Shanholtz et al. | |
| 2006/0011083 A1 | 1/2006 | Perry et al. | |
| 2009/0286013 A1 | 11/2009 | Cook et al. | |
| 2011/0104496 A1 | 5/2011 | Cook et al. | |
| 2012/0160834 A1* | 6/2012 | Ress | B29C 35/0805 219/678 |

OTHER PUBLICATIONS

"Development of the sub-micrometer spherical particle fabrication method of functional materials," Nano Systems Research Institute, accessed at http://web.archive.org/web/20120707233814/http://www.aist.go.jp/aist_j/new_research/nr20100901/nr20100901.html, Sep. 1, 2010, 6 Pages.
"Investigation of Nanometal/Carbon Fiber Composite Structures for Use in Novel Lightweight Cryotank Designs," accessed at https://www.sbir.gov/sbirsearch/detail/197059, Oct. 25, 2011, 1 Page.
"Light Guide," accessed at http://web.archive.org/web/20120525094405/http://www.sumita-opt.co.jp/ja/products/fiber/light-guide.html, accessed on Nov. 9, 2015, 4 Pages.
Ehlert, GJ., Sodano, I. H., "Carboxyl functionalization of carbon fibers through a grafting reaction that preserves fiber tensile strength," Carbon, vol. 49, Issue 3 (2011), pp. 4246-4255.
Elton Research & Development, "Catalytic Microwave Assisted Gasification for Recycling Polymer Matrix Composites," 2009, Tech Brief, retrieved from: http://www.eltronresearch.com/docs/Catalytic_Microwave_Gasification_Polymer_Matrix_Composites.pdf, 2 pages.
Hess, et. al., "Terminology of polymers containing ionisable or ionic groups and polymers containing ions," 2006, Pure Appl. Chem., vol. 78, No. 11, pp. 2067-2074.
International Search Report and Written Opinion received for PCT/US12/50352 dated Dec. 18, 2012.
Kathirgamanathan, P., "Microwave welding of thermoplastics using inherently conducting polymers," 1993, Polymer, vol. 34, No. 14, pp. 3105-3106.
Lester, E., "Microwave heating as a means for carbon fibre recovery from polymer composites: a technical feasibility study," Aug. 3, 2004, Materials Research Bulletin, vol. 39, No. 10, pp. 1549-1556.
Li and Coleman "Functionalization of carbon nanofibers with diamine and polyimide oligmer," 2008, Carbon 46(8), pp. 1115-1125.
McConnell, V. P., "Launching the carbon fibre recycling industry," Mar. 29, 2010, Reinforced Plastics, retrieved from: http://www.reinforcedplastics.com/view/8116/Iaunching-the-carbon-fibre-recycling-industry/, 6 pages.
Morgan, "Carbon Fibers and Their Composites," CRC Press, Boca Raton, FL, 2005, pp. 403-405.
Okubo, S., "Conductive ink for the Cu pattern formation in printing, NovaCentrix a showcase," accessed at http://techon.nikkeibp.co.jp/article/NEWS/20110414/191139/?ref=RL3, Apr. 13, 2011, 4 Pages.
Plaseied et al., "Effects of Carbon Nanofiber Content and Surface Treatment on the Mechanical Properties of Vinyl Ester," 2008, Polymers and Polymer Composites, 16(7), pp. 405-413.
Provatas, "Energetic polymers and plasticizers for explosive formulations," a review of recent advances, Department of Defence, Defence Science & Technology Organization, 2000, 48 pages.
Sato, Y., "Effect of Solvents on the Liquid-Phase Cracking of Thermosetting Resins," Energy & Fuels, vol. 13, Issue 2, pp. 364-368 (Jan. 15, 1999).
Ushikoshi, K., et al., "Recycling of CFRP by Pyrolysis Method," Journal of the Society of Materials Science, vol. 44, No. 499, pp. 428-431 (1995) (English abstract included).
Wise, RJ., "Microwave welding of thermoplastics," 2001, Journal of Materials Science 36, pp. 5935-5954.
Wood, Karen, "Carbon Fiber Reclamation: Going Commercial," Feb. 4, 2010, Composites World, retrieved from: http://www.compositesworld.com/articles/carbon-fiber-reclamation-going-commercial, 5 pages.
Zhao et al. "Formation of a carbon fiber/polyhedral oligomeric silsesquioxanejcarbon nanotube hybrid reinforcement and its effect on the interfacial properties of carbon fiber/epoxy composites," 2011, Carbon 49, pp. 2624-2632.

* cited by examiner

MICROWAVE DIPOLAR HEATING OF ENERGETIC POLYMERS FOR CARBON FIBER-MATRIX SEPARATION

CROSS-REFERENCE TO RELATED APPLICATIONS

This application is a Divisional Application under 35 U.S.C. §121 of U.S. application Ser. No. 13/883,446, filed on May 3, 2013, now U.S. Pat. No. 9,394,646, which is a U.S. National Phase Application under 35 U.S.C. §371 of International Application No. PCT/US2012/050352, filed on Aug. 10, 2012, which are each incorporated herein by reference in their entireties for any and all purposes.

FIELD

The present technology relates generally to a composition of a carbon fiber reinforced plastic (CFRP) and to a method for recycling carbon fibers from a CFRP. Specifically, the present technology provides recycling methods that are relatively inexpensive and permit the release of a carbon fiber from the CFRP without damage and in high yield.

BACKGROUND

Carbon fiber (CF) is a material that includes fibers composed mostly of carbon atoms and having a diameter from about 5 µm to about 10 µm. The properties of carbon fibers, such as high stiffness, high tensile strength, low weight, high chemical resistance, high temperature tolerance and low thermal expansion, make them very popular, for example, in civil, aerospace and mechanical engineering applications, in the manufacture automobiles, and the manufacture of high performance sport gear.

Carbon fibers are usually combined with other materials to form a composite. When combined with a plastic resin and wound or molded it forms carbon fiber reinforced plastic (CFRP), an extremely rigid material having a very high strength-to-weight ratio. However, carbon fibers are relatively expensive when compared to glass fibers or plastic fibers. Thus, it is desirable to recycle the carbon fiber from unwanted CFRP prior to disposal. However, current methods for recycling carbon fibers from CFRP are tedious, expensive and most importantly damage the structural integrity of the recycled fiber, often making the recycled carbon fiber unsuitable for reuse.

SUMMARY

The present technology relates to compositions of carbon fiber reinforced plastics and to methods for recycling carbon fiber from such plastics by releasing the carbon fiber from the surrounding polymeric matrix with little or no damage to the fiber. According to one aspect, there is provided a carbon fiber reinforced polymeric material, including: a polymeric matrix; at least one carbon fiber in the polymeric matrix; and an energetic polymer interface located between a surface of the carbon fiber and the polymeric matrix, wherein the energetic polymer interface is covalently coupled to the surface of the carbon fiber. In some embodiments, the surface of the carbon-fiber is functionalized by one or more groups selected from a carboxylic acid, an acid halide, an acid anhydride, an aldehyde, a hydroxyl, a vinyl, and an amine.

In certain embodiments of the present carbon-fiber reinforced plastics, the energetic polymer interface is covalently coupled to the surface of the carbon fiber through bond selected from the group consisting of an amide, an ester, an anhydride, an imine, an ether, a silyl ether, a urethane, and a carbon-carbon bond. In some embodiments of the CFRP, the energetic polymer interface is selected from the group consisting of glycidyl azide polymer (GAP), polyglycidyl nitrate (polyGLYN), nitrocellulose, azidocellulose, nitratopolyethers, fluoropolymers, polyvinylnitrates, polyvinyltriazoles, polyvinyltriazolium salts, polynitroaromatics, nitrated polybutadienes, poly(nitrooxetanes), poly(nitrooxiranes), and copolymers thereof.

In some embodiments, the CFRP further includes a microwave receptive additive in contact with the energetic polymer interface. The microwave receptive additive may be selected, e.g., from the group consisting of metals, metal salts, metal oxides, zeolites, synthetic zeolites, carbon derivatives, hydrated minerals, hydrated salts of metal compounds, polymeric receptive materials, clays, organo-modified clays, silicates, ceramics, sulfides, titanates, silicates, aluminas, carbides, and sulfur. In other embodiments, the microwave receptive additive is selected from the group consisting of powders, flakes, spheres, pellets, granules, liquids, gels, colloids, microparticles and nanoparticles. In certain embodiments, the microwave receptive additive is deposited as a monolayer or in multiple layers. In some embodiments, the microwave receptive additive is a microparticle or a nanoparticle deposited by sputtering, electron beam deposition, chemical vapor deposition, or atomic vapor deposition. In some embodiments, the microwave-receptive additive is present in an amount from about 0.01% to about 50% by weight of the energetic polymer.

In some embodiments, the CFRP further includes a polymer adhesive in contact with the energetic polymer interface and the polymeric matrix. In certain embodiments, the energetic polymer interface is covalently bonded to the polymer adhesive, and in other embodiments, the energetic polymer interface is in non-covalently contact with the polymer adhesive. The polymer adhesive may be selected from the group consisting of, e.g., plant resins; protein glues; natural latex rubber; resorcinol resin; methyl cellulose; starch; urea-formaldehyde resin; phenol-formaldehyde resin; polymer cement; acrylonitrile resin; cyanoacrylate resin; acrylic resin; epoxy resins, epoxy putty; polyamide resin; polyimide resin; polyester resin; ethylene vinyl acetate; polyethylene; polypropylene; polysulfides; polyurethanes; polyvinyl acetates; polyvinyl alcohols; polyvinyl halides; silicone adhesives; silicone rubbers; polyvinylpyrrolidone; styrene acrylic copolymer; butyl rubber; nitrile rubber; polychloroprene; polyisoprene; styrene-butadiene-styrene; styrene-ethylene/butylene-styrene; styrene-ethylene/propylene; styrene-isoprene-styrene; polyester-polyurethane resin; polyol-polyurethane resin and acrylic-polyurethane resins.

In another aspect, the present technology provides a process for recycling carbon-fiber from a carbon-fiber reinforced plastic, the process including:
  (a) exposing the carbon-fiber reinforced plastic to electromagnetic radiation to induce localized dipolar heating;
  (b) decomposing the energetic polymer interface; and
  (c) separating the decomposed energetic polymer from the carbon fiber and the polymeric matrix to obtain recycled carbon fiber,
  wherein the carbon-fiber reinforced plastic includes a polymeric matrix; at least one carbon fiber in the polymeric matrix; and an energetic polymer interface located between a surface of the carbon fiber and the polymeric matrix, wherein the energetic polymer interface is covalently coupled to the surface of the carbon fiber.

In some embodiments of the present processes, the carbon-fiber reinforced plastic is exposed to electromagnetic radiation in the presence of a solvent. In certain embodiments of the present processes, the surface of the carbon-fiber is functionalized by one or more groups selected from a carboxylic acid, an acid halide, an acid anhydride, an aldehyde, a hydroxyl, a vinyl, and an amine. In some embodiments, the energetic polymer interface is selected from the group consisting of glycidyl azide polymer (GAP), polyglycidyl nitrate (polyGLYN), nitrocellulose, azidocellulose, nitratopolyethers, fluoropolymers, polyvinylnitrates, polyvinyltriazoles, polyvinyltriazolium salts, polynitroaromatics, nitrated polybutadienes, poly(nitrooxetanes), poly(nitrooxiranes), and copolymers thereof.

In some embodiments of the present process, a microwave receptive additive is in contact with the energetic polymer interface. In some embodiments, the energetic polymer interface in contact with the microwave-receptive additive is excited more strongly by the electromagnetic radiation than the carbon fibers. In some embodiments, the microwave receptive additive is selected from the group consisting of metals, metal salts, metal oxides, zeolites, synthetic zeolites, carbon derivatives, hydrated minerals, hydrated salts of metal compounds, polymeric receptive materials, clays, organo-modified clays, silicates, ceramics, sulfides, titanates, silicates, aluminas, carbides, and sulfur.

In some embodiments of the present process, the CFRP further includes a polymer adhesive in contact with the energetic polymer interface and the polymeric matrix. In certain embodiments, the energetic polymer interface is covalently bonded to the polymer adhesive or the energetic polymer interface is in non-covalent contact with the polymer adhesive. The process may further include re-functionalizing the surface of the recycled carbon-fiber.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
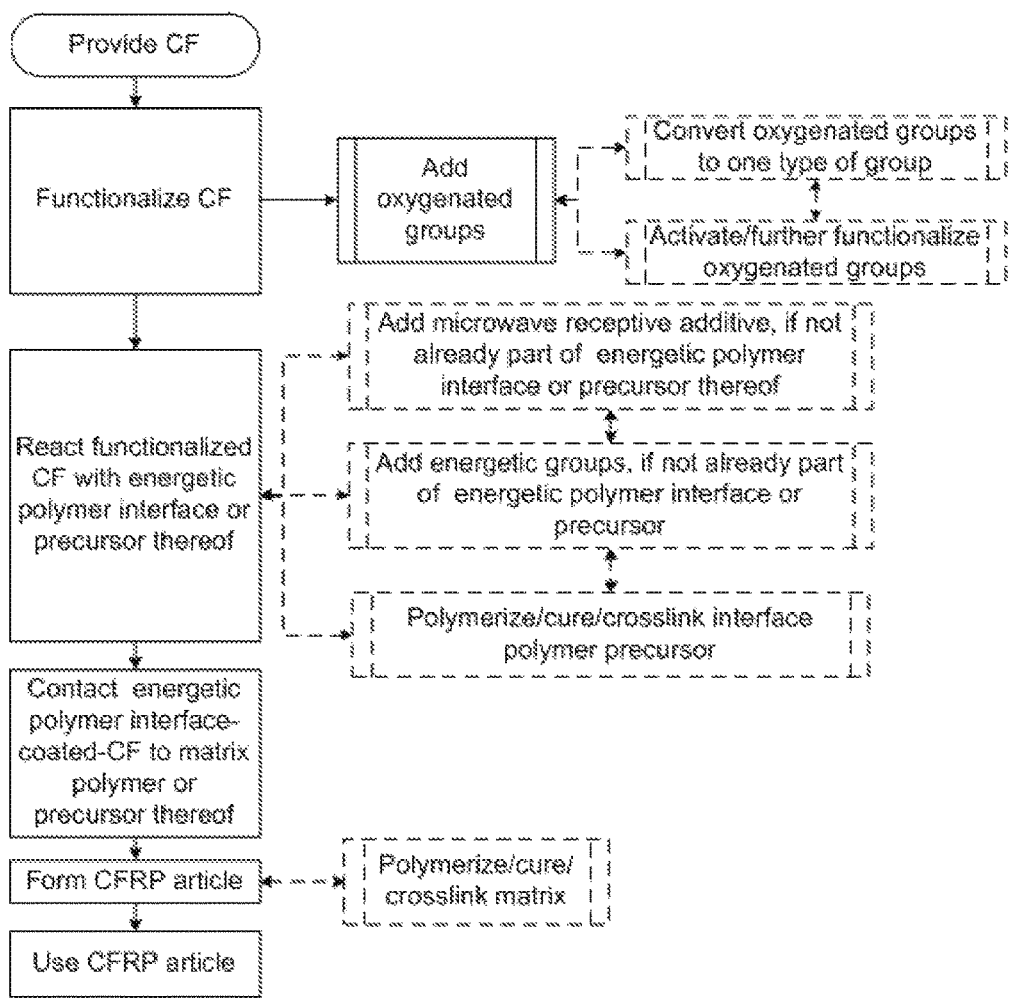
FIG. 1 shows a flow chart depicting an illustrative embodiment of the synthesis of a carbon fiber reinforced polymeric material according to the present technology.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
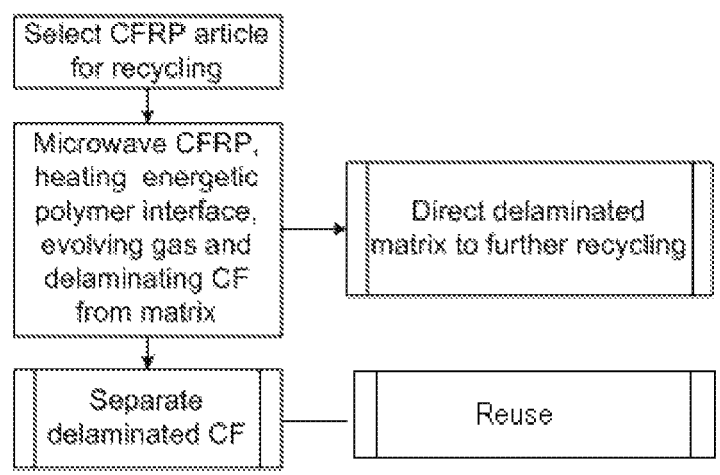
FIG. 2 shows an illustrative embodiment of a method for recycling carbon fibers from a carbon fiber reinforced polymeric material according to the present technology.

The present technology provides a new and easily recyclable CFRP, methods of making such CFRP, and methods for recovering carbon fibers from the CFRP. Specifically, the technology provides a carbon fiber reinforced plastic that includes an energetic polymer covalently coupled to the functionalized surface of the carbon fiber. In the CFRP, the carbon fiber-energetic polymer composite is in contact with a matrix polymer, e.g., an epoxy polymer, such that the energetic polymer interface is located between the surface of the carbon fiber and the polymeric matrix. In another aspect, the present technology provides methods of making the CFRP (see, e.g., FIG. 1), as well as methods for recycling carbon fibers from a carbon fiber reinforced plastic (see, e.g., FIG. 2). Thus, dipolar heating of the CFRP upon the application of electromagnetic radiation, such as microwave radiation decomposes the energetic polymer and causes the carbon fibers to separate from the polymer matrix.

The carbon fiber surface may be functionalized with, e.g., various oxygen containing species, such as carbonyl groups (—C(O)—), carboxylic acid (—COOH), carboxylic acid anhydrides, hydroxyl (—OH), or ester (—COOR) groups. The carbon fiber surface may be functionalized by both chemical and electrochemical means. Chemical treatments include without limitation the use of strong inorganic and organic acids, such as sulfuric acid, nitric acid and perchloric acid, while electrochemical oxidation utilizes an aqueous electrochemical bath and oxygen as a cheap and convenient way to functionalize the carbon fiber surface.

Scheme 1 illustrates the surface of an example of a functionalized carbon fiber. Here the surface of the carbon fiber is oxidized to provide a mixture of carboxylic acid and anhydride groups. According to one embodiment, such a carbon fiber surface is directly contacted with an energetic polymer to provide a carbon fiber with an energetic polymer interface.

Scheme 1

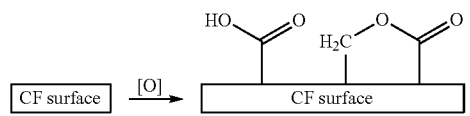

Alternatively, the oxygenated groups at the CF surface may be converted to a single type of functional group by a variety of chemical transformations. For instance, anhydride groups are hydrolyzed to carboxylic acid groups while hydroxymethylene surface groups can be subjected to reoxidation to obtain a carboxylic acid functionalized fiber. See Scheme 2.

Scheme 2

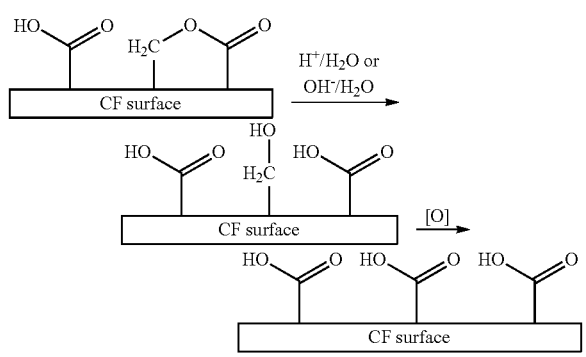

Depending on the nature of the energetic polymer, it may be useful to further functionalize the surface of the carbon fiber to provide groups other than carboxylic acid or carbonyl groups. According to one embodiment, therefore, surface carboxylic acid groups of the carbon fiber are reduced to the corresponding methylene alcohol (—CH$_2$OH), moieties using a borane. Various hydrides including, e.g., sodium hydride, lithium aluminium hydride or lithium isopropoxyaluminum hydride can also be used to convert the surface carboxylic acid groups to the corresponding alcohols.

The present technology also permits the introduction of other functional groups, such as amines, epoxides, halogens, nitriles and isocyanates on to the surface of the carbon fiber by contacting a hydroxyl functionalized carbon fiber with an appropriately substituted alkoxy silane reagent. For example, the fiber can be functionalized to provide epoxides as surface groups by contacting a hydroxyl carbon fiber with (glycidyloxypropyl) trimethoxysilane.

Reagents are also provided for introducing other functional groups onto the surface of the carbon fiber. Thus, carbon fibers functionalized with amines are obtained through the use of silane reagents that include without limitation (3-aminopropyl) trimethoxysilane, [3-(2-aminoethylamino) propyl]trimethoxysilane and N-[3-(trimethoxysilyl)propyl]ethylenediamine. Halogens are introduced using (chloropropyl) trimethoxysilane, (3-bromopropyl) trimethoxysilane, (3-iodopropyl) trimethoxysilane and (4-chlorophenyl) triethoxysilane as the reagents. Surface modifications to introduce thiols include the use of (mercaptopropyl)trimethoxysilane, while 3-(triethoxysilyl)propyl isocyanate and 3-(triethoxysilyl)propionitrile are used as reagents for introducing nitriles and isocyanates.

For certain other embodiments of the present technology, the carbon fiber is functionalized with isocyanates or terminal alkenes as the surface functional groups. Scheme 3 illustrates one method converting a hydroxyl functionalized fiber to a terminal alkene that can undergo further reactions necessary to promote the covalent bonding of an energetic polymer to the fiber.

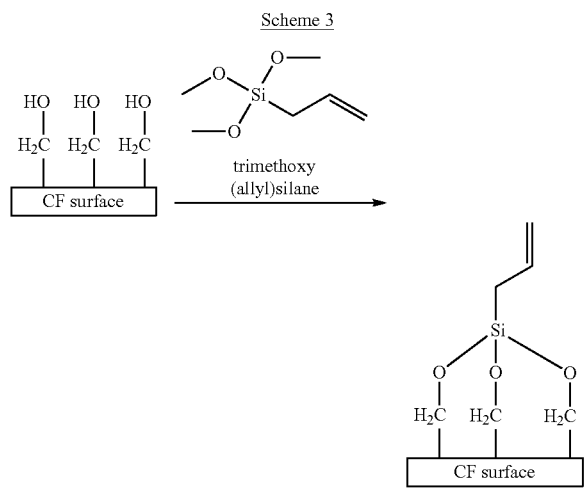

Thus, contacting a hydroxyl functionalized carbon fiber surface with a trialkoxyallyl silane, such as trimethoxyallyl silane provides an allyl functionalized fiber suitable further nucleophilic, electrophilic or metathesis chemistries with an appropriately substituted energetic polymer. Acrylates such as 3-(trimethoxysilyl)propyl acrylate, 3-(trimethoxysilyl) propyl methacrylate and alkenes such as allyltrimethoxysilane, trimethoxy(7-octen-1-yl)silane and triethoxyvinylsilane are examples of reagents for modifying the carbon fiber's surface according to this embodiment.

Energetic polymers are materials possessing reactive groups that are capable of absorbing and dissipating energy. While such polymers have been used in the explosive industry, the present technology focuses on using such polymers to decompose and delaminate the polymer matrix from the carbon fibers.

According to one embodiment, therefore, an energetic polymer is covalently bonded to the carbon fiber prior to contacting the fiber-energetic polymer interface with a polymer matrix. According to this aspect of the technology, therefore, the energetic polymer lies between carbon fiber and the polymer matrix. Alternatively, the energetic polymer interacts with the carbon fiber through non-covalent interactions.

During recycling of carbon fibers as further described below, energy absorbed by the energetic polymer interface causes this polymers reactive groups, such as azido and nitro groups to decompose releasing gas along with the dissipation of absorbed energy. The gas released promotes delamination of the polymer matrix from the carbon fibers making the latter available for recovery and reuse.

Energetic polymer interfaces according to the present technology include without limitation polymers with azide, nitro, nitrate, nitroso, nitramine, triazole, and tetrazole containing groups. Polymers or co-polymers containing other energetic nitrogen containing groups are also within the scope of the present technology. In some examples, the energetic polymer interfaces may additionally include fluoro groups, e.g., fluoroalkyl groups.

Illustrative examples of energetic polymers within the azide class include glycidyl azide polymer (GAP), for example, linear or branched GAP, GAP diol, or GAP triol. Polymers containing oxetane rings provide another group of energetic polymers as exemplified by poly[3-nitratomethyl-3-methyl oxetane] (polyNIMMO), poly(3,3-bis-(azidomethyl)oxetane (polyBAMO) and poly(3-azidomethyl-3-methyl oxetane) (polyAMMO). Further examples of energetic polymers include but are not limited to polyglycidyl nitrate polymers such as polyGLYN, nitrocellulose, azidocellulose, as well as other polymers possessing energetic, reactive groups, for example, polyvinylnitrate, polynitrophenylene, nitramine polyethers and N,N-bonded epoxy binders.

The bonding of the energetic polymer interface to the functionalized carbon fiber surface depends on the chemical nature of functional groups on the surface of the carbon fiber and functional groups present in the energetic polymer. For covalent bonding of the energetic polymer to the carbon fiber, the energetic polymer interface must contain functional groups that are capable of reacting with the carbon fiber surface functional groups. In one embodiment, energetic polymers having amines or hydroxyl groups can be covalently bonded to the carbon fiber through amide or ester bonds as illustrated below, see Scheme 4.

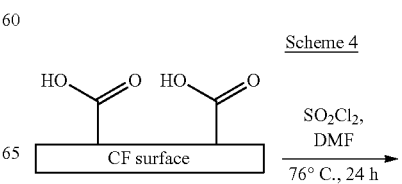

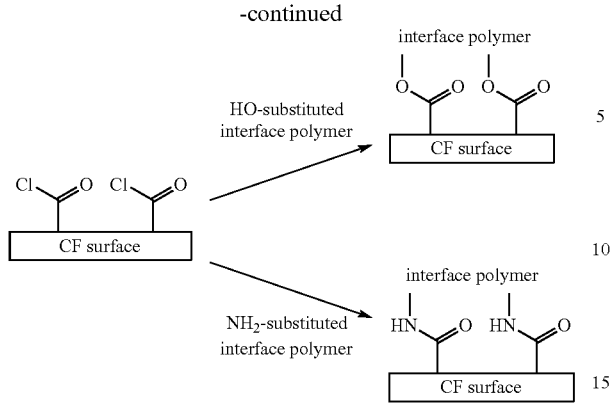

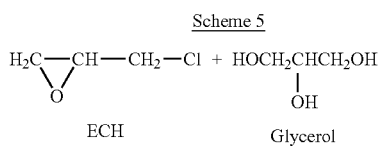

Reagents capable of activating the carbon fiber's carboxylic acid groups can optionally be used to promote coupling of the energetic polymer to the carbon fiber. Thus, contacting the carboxylic acid functionalized carbon fiber with a carbodiimide, for example, 1-(3-dimethylaminopropyl)-3-ethylcarbodiimide, N,N'-diisopropylcarbodiimide, or N,N'-dicyclohexylcarbodiimide provides the O-acylisourea as the activated carbonyl ester, and promotes coupling of an amine or hydrazide containing energetic polymer to the fiber.

Other reagents for activating surface carboxylic acid groups include p-nitrobenzoic acid, N-hydroxysuccinimide (NHS), or sulfo-N-hydroxysuccinimide (S—NHS). Peptide coupling reagents, such as O-(benzotriazol-1-yl)-N,N,N'N'-tetramethyluronium hexafluorophosphate (HBTU), (benzotriazol-1-yloxy)tris(dimethylamino)phosphonium hexafluorophosphate (BOP), 2-(N-heterocyclyloxy) uronium salts (e.g., O—(N-succinimidyl) N,N,N',N'-tetramethyluronium tetrafluoroborate (TSTU) and O-(7-azabenzotriazol-1-yl)-N,N,N'N'-tetramethyluronium hexafluorophosphate (HATU)) are optionally added to promote the formation of NHS and S—NHS esters.

An example of synthetic protocol for the synthesis of a fiber-energetic polymer interface involves contacting the carboxyl-functionalized carbon fiber with a solution of 0.1 M TSTU and 0.1M organic base (e.g., 2,6-dimethylaminopyridine) in a polar organic solvent (e.g., dimethyl formamide, dioxane, etc.). After stirring the reaction mixture for about an hour at room temperature, NHS is added to provide a NHS-ester activated carbon fiber which is isolated and washed prior to contact with an amine or hydrazide substituted energetic polymer.

According to one embodiment, the energetic polymer is a glycidyl azide polymer (GAP). GAP polymers can readily be obtained by ring-opening polymerization of epichlorohydrin to produce poly-epichlorohydrin, followed by reaction of the chloro groups with sodium azide to form a GAP diol, GAP-triol, or GAP-polyol structurally illustrated below.

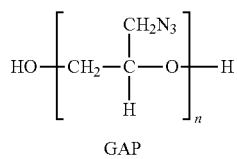

Alternatively, GAP polymers can be prepared by reacting polyols such as glycerol with epichlorohydrin to form poly-epichlorohydrin-triol (PECH-triol), followed by reaction of the triol with sodium azide to provide GAP-triols. See Scheme 5

Scheme 5

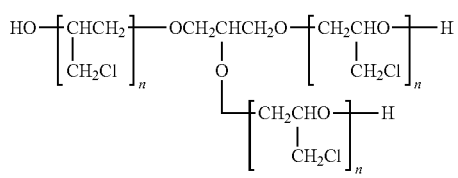

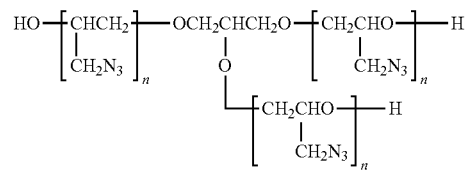

The Mitsunobu reaction provides an alternative route for converting hydroxyl groups to azides. Thus, reacting a hydroxyl group of a glycidol polymer with triphenylphosphine and hydrazoic acid under Mitsunobu conditions provides a GAP polymer as illustrated below

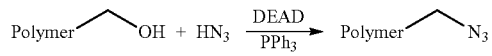

GAP-diol, GAP triol, or higher polyols can be crosslinked by contacting the GAP-polyol with a polyfunctional isocyanate. In one embodiment, therefore, the present technology provides a GAP-fiber interface using an isocyante functionalized carbon fiber. The isocyanate functionalized carbon fiber is synthesized by contacting a carboxylic acid or methylene alcohol functionalized carbon fiber surface with a diamine followed by conversion of the terminal amine group to an isocyante using phosgene. The resulting carbon fiber is then contacted with the hydroxyl group of a GAP polymer to covalently bond the GAP to the carbon fiber. See Scheme 6.

Scheme 6
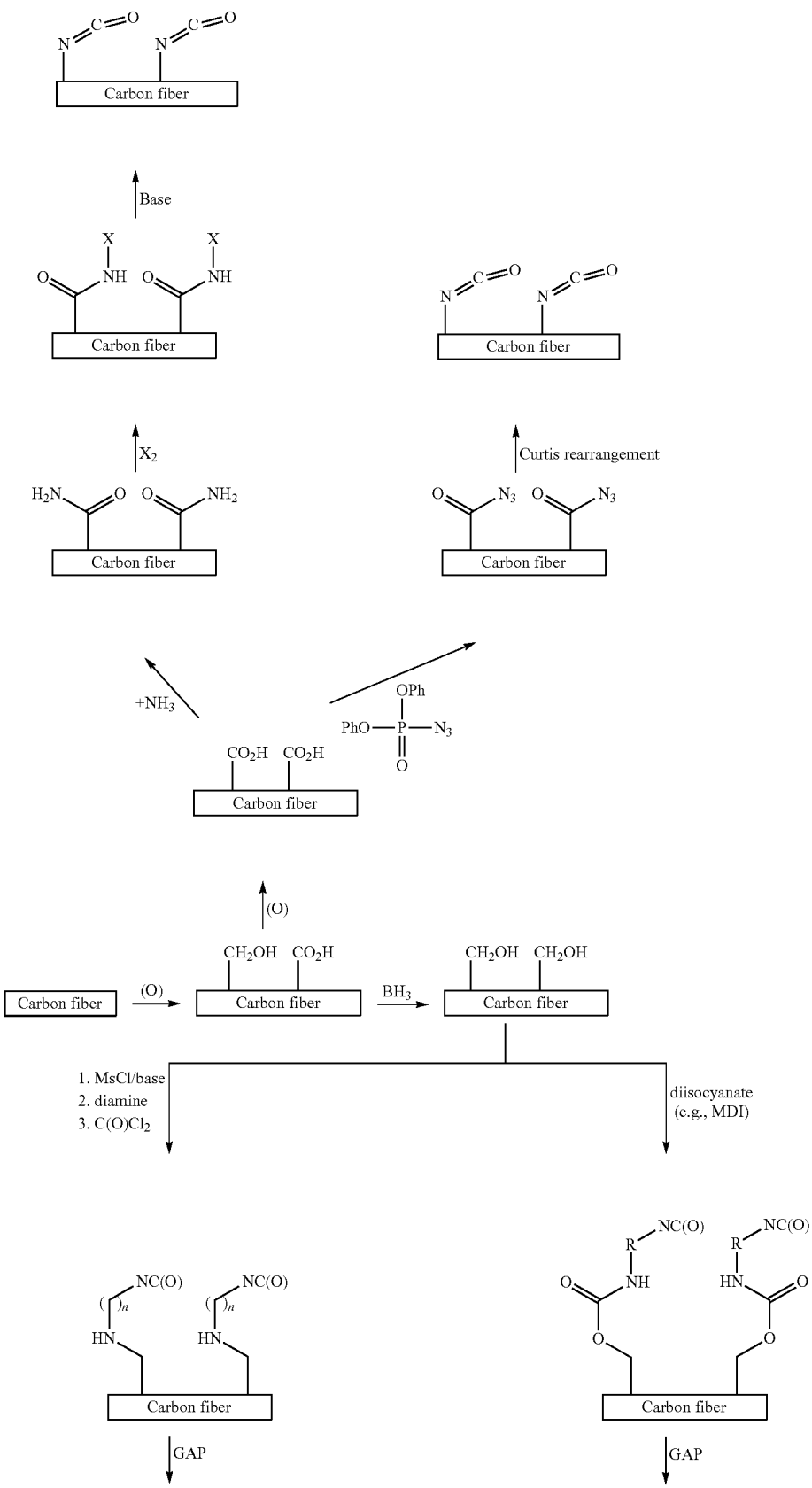

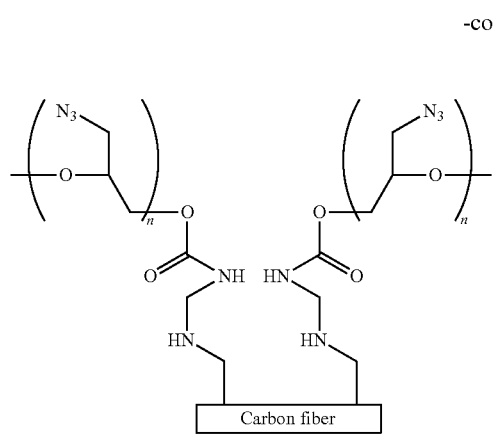

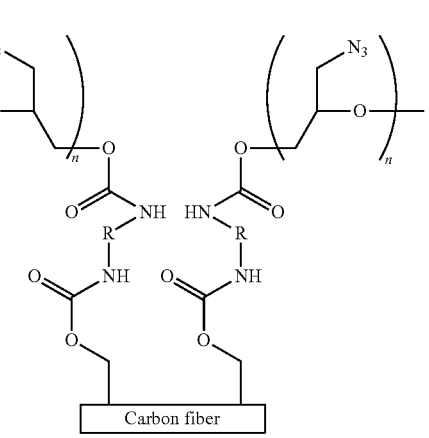

Alternatively as illustrated in Scheme 6, a hydroxyl functionalized carbon fiber surface is contacted with a diisocyanate reagent, such as toluene diisocyanate (TDI) or methylene diphenyl isocyanate (MDI), to provide an isocyanate functionalized carbon fiber surface. Direct conversion of the surface carboxylic acid groups to an isocyanate groups can also be achieved by the Curtis rearrangement. Briefly, contacting the surface carboxylic acid groups with diphenyl phosphorazide provides the corresponding acyl azide which upon heating rearranges to an isocyanate along with the concomitant release of nitrogen.

In an alternate embodiment, polymerization of epichlorohydrin in the presence of glycidol or a hydroxyl surface functionalized carbon fiber, optionally in the presence of polyols such as glycerol is used to provide a covalently bonded polyepichlorohydrin coated carbon fiber. This polyepichlorohydrin coated fiber is then contacted with sodium azide or converted under Mitsunobu conditions to the corresponding azide to obtain the desired covalently bonded GAP-carbon interface.

In certain other embodiments, polyoxetanes are provided as the energetic polymer. Briefly, nitrate or azide containing oxetane monomers are readily polymerized under cationic polymerization conditions in the presence of an initiator (e.g., diols) and a catalyst (e.g., a Lewis acid) to provide a polyoxetane unit. Thus, polymerization of 3-nitratomethyl-3-methyl oxetane using boron trifluoride etherate as catalyst as illustrated in Scheme 7 below permits the synthesis of a soft or liquid elastomer of polyoxetane which can be readily be bonded to an appropriately functionalized carbon fiber surface to provide a fiber-energetic polymer interface.

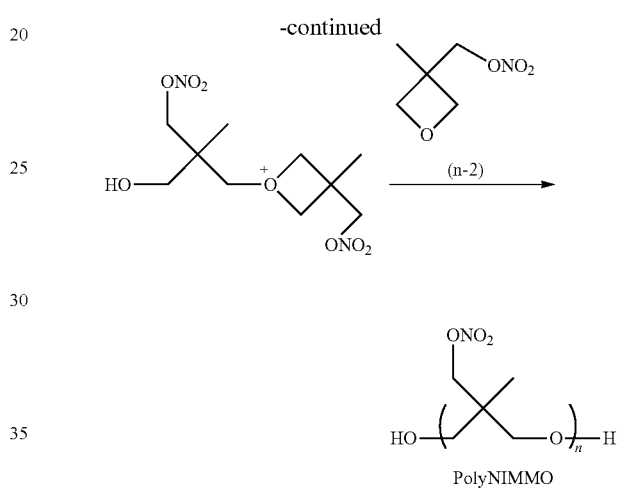

PolyNIMMO

Compounds other than boron trifluoride etherate that are suitable as catalysts for polymerizing oxetane monomers include triethoxonium tetrafluoroborate, fluoroboric acid and spirosiloxanes.

Other polymers illustrative of the class "energetic polymers" include polyglycidyl nitrate (polyGLYN) polymers. These polymers are obtained by contacting glycidyl nitrate with a polyol in the presence of a catalyst such as tetrafluoroboric acid etherate to form a hydroxyl terminated polyGLYN pre-polymer. See Scheme 8. The pre-polymer is then contacted with additional glycidyl nitrate monomers to manufacture the poly GLYN unit.

Scheme 7

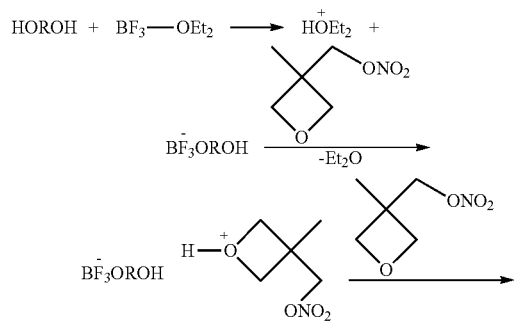

Scheme 8

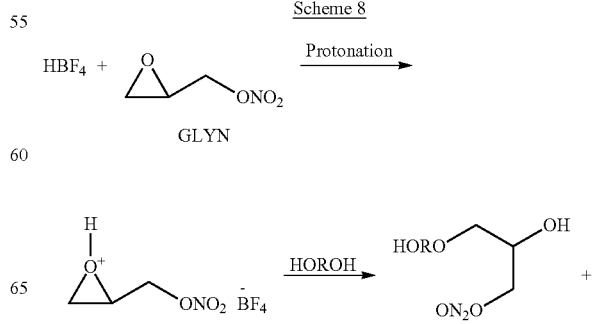

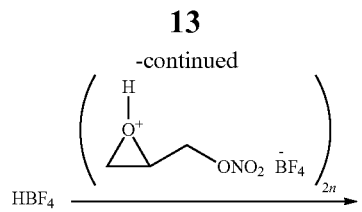

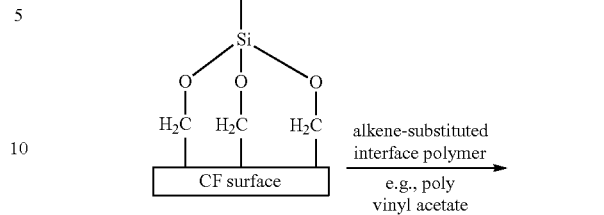

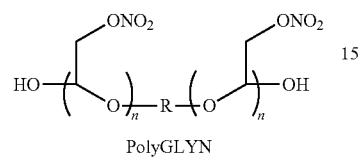

PolyGLYN

The hydroxyl-terminated polyGLYN may be obtained in branched or linear form by using desired polyols as initiators. The isocyanate functionalized carbon fiber can be coated with the polyGLYN energetic polymer using a protocol illustrated in Scheme 6.

In another example, glycidyl nitrate monomer may be reacted in the presence of glycidyl or hydroxyl functionalized CF as described herein to form a CF that is covalently bonded to the corresponding energetic polymer polyGLYN.

The present technology also provides polyvinyl nitrates as energetic polymers. To facilitate the covalent bonding of a vinyl nitrate to the carbon fiber, the present technology provides a method for introducing alkene or acrylate functional groups onto the surface of the carbon fiber. Thus, contacting the fiber with a vinyl acetate in the presence of a radical initiator catalyst provides a polyvinyl acetate functionalized carbon fiber that can be hydrolysed and nitrated, for example, by reaction with nitric acid to provide a vinyl nitrate polymer coated carbon fiber according to the present technology. Scheme 9 illustrates a protocol for covalently modifying the carbon fiber surface to include a polyvinyl nitrate.

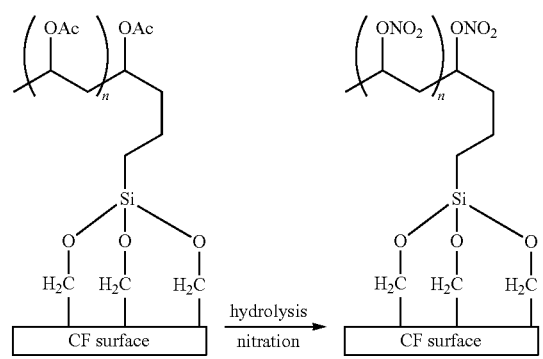

Polynitrophenylenes also provide suitable energetic polymer interfaces according to the present technology. Thus, reacting an appropriately functionalized carbon fiber, such as a hydroxymethylene functionalized fiber with 4-chlorophenol followed by copper catalyzed cross-coupling of the resultant methyl-4-chlorophenyl ether on the fiber surface with 1,3-dichloro-2,4,6 trinitrobenzene at about 150° C. (Ullmann coupling) provides a polynitrophenylene bonded carbon fiber. Other energetic polymers within the scope of the present technology include bis dicarbonylhydrazones of adipic, azelaic and sebacic dihydrazides that can be converted to the corresponding epoxides to provide epoxy functionalized energetic polymers having the general structure shown below wherein each R is independently a C1-C10 hydrocarbon group (e.g., an alkyl, cycloalkyl, aryl or aralkyl group) and x is an integer from 4 to 10 (i.e., 4, 5, 6, 7, 8, 9, or 10).

Scheme 9

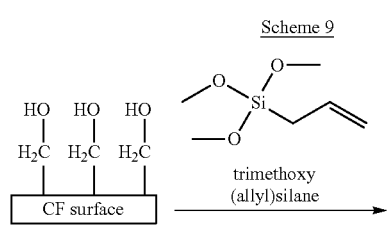

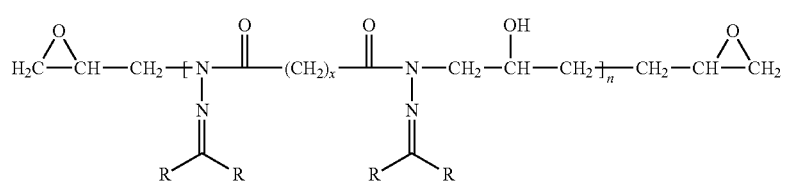

Such epoxy energetic polymers may be covalently bonded to a hydroxyl or glycidyl functionalized carbon fiber in the presence of diaminodiphenylmethane as the curing agent to provide a carbon fiber-hydrazine energetic polymer interface.

The present technology also provides ionic energetic polymers that have been synthesized via free radical polymerization of 1-vinyl-1,2,4-triazolium monomer salts or by protonation of poly(l-vinyl-1,2,4-triazole) with inorganic or organic acids. For instance, alkene or acrylate functionalized carbon fibers can be contacted with 1-vinyl-1,2,4-triazole (or an inorganic or organic acid salt thereof) in the presence of a radical initiator catalyst to provide a polyvinyltriazolium ion coated fiber. When neutral triazole is polymerized, the resulting neutral polyvinyl triazole may be protonated by contact with inorganic or organic acids. When the coating is a polyvinyl triazolium salt, the coating can provide a permanent dipole that may function as a microwave receptive group which promotes decomposition of the energetic polymeric interface during recycling.

Dipolar heating of the energetic polymer is optionally assisted by using a microwave receptive coating material. The microwave receptive additive can be any material that is capable of interacting and absorbing energy provided by an applied microwave field so as to promote localized thermal effects from dipolar polarization and ionic conduction.

In microwave dipolar heating, the partial charges in a permanent dipole such as water or in an induced dipole such as in a conjugated organic molecule attempt to follow the oscillation of the applied microwave field. The amount of heat generated by this process is directly related to the ability of the molecules to align itself with the frequency of the applied field.

By selecting a frequency of microwave radiation that provides sufficient time for the dipole to reorient itself to align with the microwave field, but not precisely, causes a phase difference between the applied field and the orientation of the dipole. This phase difference causes energy to be lost from the dipole by molecular friction and collisions, giving rise dielectric heating.

Alternatively, without wishing to be bound to a particular theory, it is believed that transition states or other decomposition products of reactive groups present in the energetic polymer interface may themselves function as microwave-receptive groups. For example, changes in the transition state accompanying a decomposing nitrate or azide group of an energetic polymer may enhance the deposition of microwave radiation energy into the energetic polymer to further provide decomposition and separation of carbon fibers from the polymer matrix.

The microwave receptive additive can be in a form suitable for coating the surface of the energetic polymer or in a form suitable for blending, mixing or for incorporation into the energetic polymer matrix. One aspect of the present technology provides a microwave receptive additive that is coated as a monolayer onto the energetic polymer. Alternatively, more than one layer of the microwave receptive additive can be coated onto the surface of the energetic polymer.

The present technology also provides microwave receptive additives as powders, flakes, spheres, pellets, granules, liquids, gels, colloids, microparticles and nanoparticles that can be combined with the energetic polymer. For instance, a microwave receptive additive in the form of a powder, pellet, or flake can be combined with the energetic polymer during polymerization or physically mixed with the energetic polymer. When the microwave receptive additive is to be provided as a microparticle or a nanoparticle, sputtering, electron beam deposition, chemical vapor deposition, or atomic vapor deposition techniques may be utilized.

Examples of materials that may serve as "microwave receptive additives" include without limitation metals, metal salts, metal oxides, zeolites, synthetic zeolites, carbon derivatives, hydrated minerals, hydrated salts of metal compounds, polymeric receptive materials, clays, organo-modified clays, silicates, ceramics, sulfides, titanates, silicates, aluminas, carbides, and sulfur.

When metals are used as the microwave receptive additive, examples of metals include without limitation carbon, cobalt, nickel, iron, zinc, aluminum, copper silver gold, chromium, molybdenum and tungsten. Examples of metals salts include without limitation halogenated salts of copper, zinc, tin or hydrated salts of nickel and aluminum, such as $NiCl_2.6H_2O$, $Al_2(SO_4)_3.18H_2O$ or ettringite.

In some embodiments the microwave receptive additive is a metal oxide selected from zinc oxide, manganese oxides, oxides of aluminum ($Al_2O_3$), cupric oxide, cuprous oxide, nickel oxide, $Fe_3O_4$, $Fe_2O_3$, FeO, $TiO_2$ and $Co_3O_3$. Perovskites such as $BaTiO_3$, $Na_2TiO_3$ and $Mg_2TiO_4$ can also be used as the microwave receptive additive as are the sulfide of certain metals including without limitation $Ag_2S$, CuS, $MoS_2$, PbS, ZnS, FeS, iron pyrite ($FeS_2$), and other pyrites.

According to another embodiment, the microwave receptive additive is a metal carbide or a metal nitride. Examples of this class are $W_2C$, SiC, $B_4C$, and TiN.

Other compounds that can be used as microwave receptive additives include: (a) semiconductors such as Si, Ge, Se, GaP, GaAs, InP, InAs, CdS, CdSe, and ZnSe; (b) ion conductors, such as solid acids, beta alumina, polymer acids, and ion exchangers; (c) water-containing materials, such as hydrated forms of zeolites, silicas, aluminas, aluminophosphates, aluminosilicates, magnesia, titania, clays, micas, gels, vermiculites, attapulgites, sepiolites, other inorganic gels; (d) organic hydrogels such as superabsorbent polymers including polyacrylate hydrogels, Methocel, hydroxyethylcellulose (HEC), carboxymethylcellulose, and microencapsulated water; (e) molecular, oligomeric, or polymeric material with permanent dipoles, such as molecules, oligomers, or polymeric materials having functionalities which may include mono- or poly-substitution with hydroxyls, amines, amides, carbonyls, esters, carbonates, carbamates, ureas, thioureas, nitriles, nitros, nitrates, nitrosyls, hydroxylamines, ammoniums, sulfonamides, sulfhydryls, sulfides, sulfones, sulfoxides, phosphates, phosphonates, phosphonamides, halides, oxyhalides, and may also include sugars, amino acids, lactams, ethylene carbon monoxide (ECO) copolymers, polyamides, polyesters, polyacrylates, acrylate copolymers, acrylate-modified polymers, starches, keratin, gelatin, other bioproducts, formamide, n-methyl formamide, n-methylacetamide, and combinations thereof; (f) caged dipoles, such as the dipoles listed above that are absorbed in zeolites, clays, onto silica gel or other inorganic or organic sorbents; (g) organic conductors, other than metals and semiconductors, such as polyaniline, polypyrrole, polyacetylene, and other organic conductors; (h) magnetic materials such as hard or soft ferrites, Sr or Ba titanates, CoZn, NiZn, or MnZn.

Ceramics can also promote localized heating of the energetic polymer upon exposure to a microwave field and are thus suitable for use as a microwave receptive additive according to the present technology. For example, ceramics such as manganese oxide and dicobalt trioxide in contact with an energetic polymer readily cause decomposition and release of the carbon fibers from the polymer matrix. Other ceramics absorb microwaves to a lesser extent. Aluminum oxide (alumina) interacts poorly with microwave energy until a critical temperature is reached. For an energetic polymer in contact with aluminum oxide, therefore, it may be necessary to aid heating through the use of dopants to achieve such a critical temperature. Thus, the degree to which the microwave receptive additive will promote thermal spikes in the energetic polymer will depend in part on its dielectric loss factor which describes the strength of interaction between the material and the electromagnetic wave.

In certain embodiments, the microwave receptive additives may include carbon derivatives, for example, graphite, carbon black, graphene, modified graphene such as graphene oxide, carbon nanotubes, or fullerenes.

Silicates can also be used as the microwave receptive additives. Examples of such compounds include aluminum silicates, iron ferrites such as $Fe_3O_4$, zeolites such as Zeolite A, carbon derivatives, or combinations thereof.

Microwave receptive additives may also include crystalline additives that effectively function as receptors of microwave energy, and may include ionic conductors such as inorganic solid acids or salts, polymer acids or salts, or inorganic or polymeric ion-exchangers, for example, the synthetic Zeolite 4A.

Compounds that may be effective as microwave receptors include water containing materials where the additive contains an amount of water suitable for enhancing receptivity of the additive to microwaves. This hydrated additive may be based on inorganic, molecular, or polymeric substances. For example, a hydrated inorganic additive may be a hydrated Zeolite 13X, where the zeolite is capable of absorbing up to 30% of its weight as water; hydrated alumina; water contained in nanotubes, between graphene layers, or in the pores of nanoporous carbon; or the like.

In further embodiments, compounds that could be effective as microwave receptors include inorganic or polymeric substances which contain a molecular or polymer species capable of interacting with microwave radiation. These species can be encapsulated within the inorganic or polymeric substance, or can be present as a coating on particles of the inorganic or polymeric substance. Alternatively, compounds effective as microwave receptors may reside as a guest within the pores of the inorganic or polymeric substance. For example, ethylene glycol may be adsorbed in the 3-dimensional cages of zeolite NaY.

Sepiolite clay is another substance that can be used as a microwave receptive additive. Sepiolite is a natural clay mineral that contains bound molecules of water. The bound water allows the clay to absorb microwave energy. As a result, the clay permits the heating of material with which it is in contact, often with reduced or substantially no formation of bubbles during heating.

Certain embodiments according to the present technology utilize molecular sieves or zeolites formed from an ammonium ion salt or a hydrogen ion salt as a microwave receptive additive. For instance, an ammonium form of molecular sieve Y in contact with the energetic polymer can serve as the microwave receptive additive. Synthetic zeolites or zeolite-like materials, for example, synthetic alumino-phosphates, silicoaluminophosphates, silicotitanates, and/or admixtures of light metals having structures and hydration behaviour similar to that of zeolitic materials can also be used as microwave receptive additives.

Other microwave receptive additives include molecular sieves or zeolites formed from alkali metal salts or alkaline earth metal salts and zeolite cages having an adsorbed organic material.

Illustrative of polymeric microwave-receptive additives are polyaniline, poly-para-phenylene, polythiophene, polypyrrole, polyacetylene, polyphenylene vinylene, polythiophene vinylene, poly pyridine vinylene, ethylenevinylalcohol polymers, polyketones, polyurethanes, polyamides, polyvinylchloride, polyacrylates, ethylene carbon monoxide copolymers, polyaniline, and others, for example.

The receptivity of these polymers to microwave radiation is enhanced by incorporating certain chemical functional groups into the polymer's structure. Thus, modifying the polymer's structure to introduce —CO, —OH, —NH, groups or incorporate methacrylates, carbon dioxide, acrylic acids, vinyl acetate, alcohols, vinyl or polyvinyl alcohols, charged ionic groups such as ammonium, carboxylate, sulfonate, sulfate, phosphate, or phosphonates, into the polymer backbone or pendant to the polymer chain enhances the polymer's microwave receptivity.

The preferred form of the microwave receptive additive also depends on the stage at which the additive is blended, such as during the polymerization process, during purification or pelletizing of the polymer, or during a compounding process. Sometimes the additive may be compounded immediately prior to or during a primary or secondary fabrication process, such as during extrusion, injection molding, or other processes using polymers.

A single species of microwave-receptive additives according to the present technology may be contacted with the energetic polymer or more than one species of microwave receptive additives can be combined to provide the desired effect of selective localized heating. For example, a synergistic effect may be realized when various zeolites are combined, giving much higher microwave receptivity than the receptivity obtained using one form of zeolite alone. Such combinations of microwave-receptive additives are well known in the art.

The physical nature of the microwave-receptive additive also depends on the manufacturing process. According to one embodiment, the additive can be used as a solid powder, which may be compounded into the polymer. If used as a particle the dimensions used may depend upon the size of the polymer matrix in which the additive is to be dispersed. For example, larger polymers can accommodate larger particles. In some embodiments, the average particle size of the microwave receptive additive can be about 0.1 nm, about 1 nm, about 10 nm, about 100 nm, about 500 nm, about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 25 µm, about 30 µm, about 35 µm, about 40 µm, about 45 µm, about 50 µm, or greater than 50 µm, or may fall in a range between and including any two of these values. The particles used as microwave-receptive additives may include monodisperse particles (having a narrow size range), or polydisperse particles (having a broad size range).

In some examples, the microwave receptive additives may exhibit a narrow band response to electromagnetic energy. In other examples, the microwave receptive additive may be heated by irradiation across a broad band of frequencies. In some examples, the microwave additive is receptive to an applied frequency of 1 MHz, 10 MHz, 50 MHz, 100 MHz, 200 MHz, 300 MHz, 400 MHz, 500 MHz, 600 MHz, 700 MHz, 800 MHz, 900 MHz, 1 GHz, 2 GHz, 3 GHz, 4 GHz, 5 GHz, 6 GHz, 7 GHz, 8 GHz, 9 GHz, 10 GHz, 20 GHz, 30 GHz, 40 GHz, 50 GHz, 60 GHz, 70 GHz, 80 GHz, 90 GHz, 100 GHz, 120 GHz, 140 GHz, 160 GHz, 180 GHz, 200 GHz, 8 GHz, 220 GHz, 240 GHz, 260 GHz, 280 GHz, 300 GHz, or may fall in a range between and including any two of these values.

According to an aspect of the present technology, polymeric particles containing the microwave sensitive additive are formed by dry blending a base polymer and a microwave receptive additive. According to another aspect of the technology, the microwave sensitive polymer particle is formed by compounding or by coating the additive on to a polymer particle. Alternatively, a microwave sensitive particle may be formed by blending a microwave receptive additive with a wet polymer dispersion and subsequently drying off the water or solvent from the dispersion.

According to the present technology, the fiber-energetic polymer interface is contacted with a polymeric matrix to provide a carbon reinforced plastic material. Contact between the fiber-energetic polymer interface the polymer matrix is through non-covalent interactions, such as hydrogen bonds, electrostatic or Van der Waal interactions or through covalent bonding to the polymer matrix. According to one embodiment, the energetic polymeric interface is non-covalently contacted with the polymeric matrix. For example, many energetic polymers such as GAP may exhibit adhesive or elastomeric qualities which provide sufficient adhesive interaction between the energetic polymer interface and the polymeric matrix.

If the energetic polymer interface is covalently bonded to the polymeric matrix, then the energetic polymeric interface includes reactive groups, such as hydroxyl, carbonyl or carboxylic acid groups that can react with appropriate functional groups in the polymeric matrix. Thus, hydroxyl groups in the energetic polymeric interface may react with isocyanate groups in the polymeric matrix to covalently bond the energetic polymer to the matrix polymer.

Alternatively, the energetic polymer interface may be combined or copolymerized with a polymer adhesive. As used herein, a polymer adhesive is a material containing at least one polymer that forms an adhesive bond in response to pressure, heat, solvent removal, curing, polymerization, crosslinking, or other adhesive conditions. Polymer adhesives may include one or more of: plant resins, protein glues, natural latex rubber, resorcinol resin, methyl cellulose, starch, urea-formaldehyde resins, phenol-formaldehyde resins, polymer cements such as polystyrene in butanone, or synthetic monomer glues such as acrylonitrile; cyanoacrylate, acrylic as the adhesive component. Also provided by the present technology are two component curing resins such as epoxy resins, epoxy putty, and other commercially available epoxy compounds.

Other polymer adhesives include polyamide resin; polyimide resin; polyester resin; hot melt glues such as ethylene vinyl acetate, polyethylene, or polypropylenes, as well as polysulfides, polyurethanes, polyvinyl acetates, polyvinyl alcohols, polyvinyl halides such as polyvinyl chloride emulsion; silicone adhesives and silicone rubbers.

Polymer adhesives within the scope of the present technology further include polyvinylpyrrolidone, styrene acrylic copolymers, acrylics, butyl rubber, nitrile rubber; polychloroprene; polyisoprene; styrene block copolymers such as styrene-butadiene-styrene, styrene-ethylene/butylene-styrene polymers, styrene-ethylene/propylene polymers, styrene-isoprene-styrene polymers, or combinations and copolymers of the above mentioned polymers. Resins such as polyester-polyurethane resin, polyol-polyurethane resin, acrylic-polyurethane resin and polyimide resin can also be used as polymer adhesive.

As stated above, recycling of carbon fibers from a carbon fiber reinforced plastic is difficult and time-consuming process that often damages the recovered carbon fiber making it incompatible for further use. The present technology provides a facile method for separating carbon fibers from the polymer matrix that permits the recovery and reuse of recycled carbon fibers. Briefly, the present technology relies on the use of an energetic polymer interface lying between the carbon fiber and polymer matrix coating to absorb energy supplied in the form of radiofrequency radiation to promote localized heating and decomposition of gas producing functional groups in the energetic polymer to delaminate the polymer matrix from the carbon fibers.

High quality, undamaged carbon fibers may be recovered using the recycling methodology of the present technology. While not wishing to be bound by theory, it is believed that the gentle release of the carbon fiber from the carbon fiber reinforced plastic results from and/or is promoted through the generation and build up of gas at the interface between the fibers and the matrix polymer that facilitates the disruption and release of the matrix polymer from the carbon fiber-energetic polymer interface.

EXAMPLES

Example 1: Functionalization of CF with Oxygenated Groups

A 4×6 inch swatch of prewoven carbon fiber (CF swatch) will be obtained (5.7 oz/sq yd, 50" Wide, 0.012" Thick, 3K, 2×2 Twill Weave; #1069, Fibre Glast Development Corp. Brookville, Ohio). Although most commercially available carbon fiber is believed to contain surface-oxygenated groups, the surface may be further treated if desired to ensure full oxygenation of the surface. Accordingly, the CF swatch will be submerged in a minimal amount of a mixture of 3:1 v/v mixture of concentrated sulfuric acid in concentrated nitric acid at about 60° C. for about 2 hours. A convenient method of using a minimal amount of the oxidation mixture is to roll the swatch and insert it into a suitably sized test tube, followed by the addition of a volume of the oxidant sufficient to submerge the roll. The treated CF swatch will then be washed with deionized water until the wash water is neutral, and dried to obtain a carboxyl functionalized CF swatch.

Example 2: Reduction of Surface Oxygenated Groups to Hydroxymethyl Groups in CF

Either a commercially available surface oxygenated swatch of CF or the carboxyl functionalized CF swatch from the preceding example will be reduced to a hydroxymethyl functionalized surface by reaction with a reducing agent such as borane, lithium aluminum hydride, or sodium borohydride. Briefly, the carboxyl functionalized CF swatch will be submerged in a minimal amount of dry tetrahydrofuran and cooled to 0° C., followed by addition of an excess of 1 molar solution of borane in tetrahydrofuran (e.g., about 1 mL for a 4×6" swatch). The mixture will be stirred or agitated and the temperature will be allowed to rise to room temperature over 1 h period. After refluxing the reaction mixture overnight the solvent will be decanted and the hydroxymethyl functionalized CF swatch will be rinsed several times with diethyl ether and dried.

Example 3: Formation of polyGLYN-Coated CF

The hydroxymethyl functionalized CF swatch will be submerged in dry tetrahydrofuran and 100 micrograms of tetrafluoroboric acid etherate will be added as an initiator. This reaction is similar to that shown in Scheme 8, except here, a hydroxymethyl functionalized CF swatch takes the place of the "polyol" represented by HOROH in Scheme 8. After stirring the mixture for 1 hour a solution of about 50 mg/mL of glycidyl nitrate in tetrahydrofuran will be added drop wise. The amount of glycidyl nitrate added should be sufficient to coat the surface of the carbon fiber with the energetic polymer having the desired thickness. For example, a 4"×6" swatch of pre-woven carbon fiber requires a total of about 50 mg of glycidyl nitrate to result in a coating having an average thickness on the order of 0.1 micrometer. The polymerization reaction will be terminated upon formation of the surface coating by an aqueous workup, followed by neutralization using a buffer solution. The resulting polyGLYN coated CF with be washed with ether and carefully dried under vacuum at room temperature.

Example 4: Addition of Microwave-Receptive Additive (1)

The polyGLYN coated CF will be coated with a microwave receptive additive by tumbling the polyGLYN coated CF with the additive in powder form or by spray coating using a dry aerosol of the additive. For example, the polyGLYN coated CF may be sprayed with a dry aerosol of micronized alumina having an average particle diameter of about 1 micrometer to obtain a microwave-receptive polyGLYN coated CF swatch.

Example 5: Addition of Microwave-Receptive Additive (2)

The hydroxymethyl functionalized CF swatch will be submerged in dry tetrahydrofuran and 100 micrograms of tetrafluoroboric acid etherate will be added to this mixture as a catalyst for initiating the reaction. After stirring the reaction mixture for 1 hour to permit activation of the hydroxymethyl groups by the tetrafluoroboric acid etherate initiator, 100 mg of micronized alumina having an average particle diameter of about 1 micrometer will be added with constant stirring. A solution of about 50 mg/mL of glycidyl nitrate in tetrahydrofuran will then be added dropwise, with stirring to the reaction mixture. The amount of glycidyl nitrate added will be sufficient to coat the surface of the carbon fiber with the energetic polymer having the desired thickness. For example, a 4"×6" swatch of pre-woven carbon fiber will require a total of about 50 mg of glycidyl nitrate to result in a coating having an average thickness on the order of 0.1 micrometer. The polymerization reaction will be terminated by an aqueous workup, followed by neutralization using a buffer solution, once a surface coating of desired thickness has been achieved. Polymerization according to this protocol may incorporate some of the micronized alumina via noncovalent binding. The resulting polyGLYN coated CF will be washed with ether and carefully dried under vacuum at room temperature.

Example 6: Preparation of CFRP Article

To manufacture the CFRP, the microwave-receptive polyGLYN coated CF swatch will be placed in a mold suitable for impregnation with the matrix polymer. Briefly a commercial epoxy resin (#2000-A, Fibre Glast Development Corp. Brookville, Ohio) will be mixed with an epoxy hardener, for example, in a 4:1 v/v ratio or according to the instructions provided by the manufacturer (#2020-A, Fibre Glast Development Corp. Brookville, Ohio) to form an epoxy mixture. The epoxy mixture will immediately be coated on or impregnated into the glycidyl-functionalized CF and allowed to cure to form a carbon fiber reinforced polymer (CFRP) article.

Example 7: Microwave Induced Delamination of CF-Resin Interface in CFRP Article The CFRP article containing the microwave-receptive polyGLYN coated CF swatch will be irradiated with microwave radiation, for example, at a power level of about 1000 watts at a frequency of about 2.45 GHz for 10-60 seconds. The microwave receptive additive present in the CFRP article absorbs the microwave radiation, to cause localized heating at the surface of the carbon fiber that results in the thermal decomposition of the polyGLYN coating, and the generation of gas that causes delamination of the epoxy matrix from the carbon fibers. This step may be conducted before, after, or concurrent with other processes employed for recycling the resin itself. For example, the microwave induced delamination may first be conducted on the CFRP article. Subsequently, an epoxy resin depolymerization process may be applied to the delaminated CFRP article to further break up the resin so that the carbon fiber may be separated from the resin. Examples of suitable resin depolymerization processes are known in the art (e.g., Adherent Technologies, Inc Albuquerque N. Mex.). The carbon fiber recovered from delamination and depolymerization may be washed with water, dried, dewoven or sorted to form a collection of fibers suitable for recycled use.

Example 8: Regeneration of the Recovered CF

The carbon fiber recovered from delamination and depolymerization will be examined to determine its suitability for recycling and regeneration. Infrared or Raman spectroscopy may be used amongst other spectral analysis methodologies to examine the carbon fiber's surface. Samples of carbon fiber needing regeneration will be treated as described herein.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process for recycling carbon fiber from a carbon-fiber reinforced plastic,
the carbon-fiber reinforced plastic comprising:
   a polymeric matrix;
   at least one carbon fiber in the polymeric matrix, wherein the at least one carbon fiber comprises an exterior surface; and
   an energetic polymer interface located between the exterior surface of the at least one carbon fiber and the polymeric matrix;
   wherein the energetic polymer interface is covalently coupled to the exterior surface of the at least one carbon fiber;
the process comprising:
   exposing the carbon-fiber reinforced plastic to electromagnetic radiation to induce localized dipolar heating;
   decomposing the energetic polymer interface; and
   separating the decomposed energetic polymer interface and the polymeric matrix from the at least one carbon fiber to obtain recycled carbon fiber, wherein the recycled carbon fiber comprises the exterior surface.

2. The process of claim 1, wherein the carbon-fiber reinforced plastic is exposed to the electromagnetic radiation in the presence of a solvent.

3. The process of claim 1, wherein the electromagnetic radiation comprises a wavelength of 1 MHz to 300 MHz.

4. The process of claim 1, wherein the process further comprises re-functionalizing the exterior surface of the recycled carbon fiber.

5. The process of claim 4, wherein the re-functionalizing comprises chemical treatment with a strong inorganic acid, a strong organic acid, or both.

6. The process of claim 4, wherein the re-functionalizing comprises electrochemical oxidation in an aqueous electrochemical bath in the presence of oxygen.

7. The process of claim 1, wherein the exterior surface of the carbon fiber is functionalized by one or more groups selected from a carboxylic acid, an acid halide, an acid anhydride, an aldehyde, a hydroxyl, a vinyl, and an amine.

8. The process of claim 1, wherein the energetic polymer interface is covalently coupled to the exterior surface of the carbon fiber through a bond selected from the group consisting of an amide, an ester, an anhydride, an imine, an ether, a silyl ether, a urethane, and a carbon-carbon bond.

9. The process of claim 1, wherein the energetic polymer interface is selected from the group consisting of glycidyl azide polymer (GAP), polyglycidyl nitrate (polyGLYN), nitrocellulose, aiidocellulose, nitratopolyethers, fluoropolymers, polyvinylnitrates, polyvinyltriazoles, polyvinyltriazolium salts, polynitroaromatics, nitrated polybutadienes, poly(nitrooxetanes), poly(nitrooxiranes), and copolymers thereof.

10. The process of claim 1, wherein the carbon-fiber reinforced plastic further comprises a microwave receptive additive in contact with the energetic polymer interface.

11. The process of claim 10, wherein the energetic polymer interface in contact with the microwave receptive additive is excited more strongly than the carbon fiber, by the electromagnetic radiation.

12. The process of claim 10, wherein the microwave receptive additive is present in an amount from 0.01% by weight to 50% by weight of the energetic polymer interface.

13. The process of claim 10, wherein the microwave receptive additive is selected from the group consisting of metals, metal salts, metal oxides, zeolites, synthetic zeolites, carbon derivatives, hydrated minerals, hydrated salts of metal compounds, polymeric receptive materials, clays, organo-modified clays, silicates, ceramics, sulfides, titanates, silicates, aluminas, carbides, and sulfur.

14. The process of claim 10, wherein the process comprises exposing the carbon-fiber reinforced plastic to microwave radiation to induce the localized dipolar heating.

15. The process of claim 12, wherein the process comprises exposing the carbon-fiber reinforced plastic to microwave radiation to induce the localized dipolar heating.

16. The process of claim 13, wherein the process comprises exposing the carbon-fiber reinforced plastic to microwave radiation to induce the localized dipolar heating.

17. The process of claim 1, wherein the carbon-fiber reinforced plastic further comprises a polymer adhesive in contact with the energetic polymer interface and the polymeric matrix.

18. The process of claim 17, wherein the energetic polymer interface is covalently bonded to the polymer adhesive.

19. The process of claim 17, wherein the energetic polymer interface is in non-covalent contact with the polymer adhesive.

20. The process of claim 17, wherein the polymer adhesive is selected from the group consisting of plant resins; protein glues; natural latex rubber; resorcinol resin; methyl cellulose; starch; urea-formaldehyde resin; phenol-formaldehyde resin; polymer cement; acrylonitrile resin; cyanoacrylate resin; acrylic resin; epoxy resins; epoxy putty; polyamide resin; polyimide resin; polyester resin; ethylene vinyl acetate; polyethylene; polypropylene; polysulfides; polyurethanes; polyvinyl acetates; polyvinyl alcohols; polyvinyl halides; silicone adhesives; silicone rubbers; polyvinylpyrrolidone; styrene acrylic copolymer; butyl rubber; nitrile rubber; polychloroprene; polyisoprene; styrene-butadiene-styrene; styrene-ethylene/butylene-styrene; styrene-ethylene/propylene; styrene-isoprene-styrene; polyester-polyurethane resin; polyol-polyurethane resin; and acrylic-polyurethane resins.

* * * * *

UNITED STATES PATENT AND TRADEMARK OFFICE
CERTIFICATE OF CORRECTION

PATENT NO. : 9,821,493 B2
APPLICATION NO. : 15/174405
DATED : November 21, 2017
INVENTOR(S) : Anderson et al.

It is certified that error appears in the above-identified patent and that said Letters Patent is hereby corrected as shown below:

In the Specification

Column 8, Line 47, delete "below" and insert -- below. --, therefor.

In the Claims

Column 24, Line 16, Claim 9, delete "aiidocellulose," and insert -- azidocellulose, --, therefor.

Signed and Sealed this
Twentieth Day of March, 2018

Andrei Iancu
*Director of the United States Patent and Trademark Office*